United States Patent
Jahn et al.

(10) Patent No.: US 7,544,121 B2
(45) Date of Patent: Jun. 9, 2009

(54) VENTILATION UNIT

(75) Inventors: Thomas Jahn, Forst bei Bruchsal (DE); Peter Metz, Freimersheim (DE); Volker Doll, Ranschbach (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 80 days.

(21) Appl. No.: 10/512,180

(22) PCT Filed: Apr. 24, 2003

(86) PCT No.: PCT/EP03/04267

§ 371 (c)(1),
(2), (4) Date: Jun. 20, 2005

(87) PCT Pub. No.: WO03/091049

PCT Pub. Date: Nov. 6, 2003

(65) Prior Publication Data

US 2005/0239389 A1    Oct. 27, 2005

(30) Foreign Application Priority Data

Apr. 24, 2002    (DE) ................ 102 19 053

(51) Int. Cl.
*B60S 1/54*    (2006.01)
(52) U.S. Cl. ............ 454/127; 454/155; 454/197
(58) Field of Classification Search .......... 454/155, 454/107, 127
See application file for complete search history.

(56) References Cited

U.S. PATENT DOCUMENTS

| | | | |
|---|---|---|---|
| 4,541,611 A | | 9/1985 | Tannenläufer et al. |
| 4,562,957 A | | 1/1986 | Nakagawa et al. |
| 4,664,022 A | | 5/1987 | Oddenino |
| 4,840,113 A | | 6/1989 | Freitag et al. |
| 5,080,002 A | | 1/1992 | Soethout et al. |
| 5,470,276 A | | 11/1995 | Burnell et al. |
| 5,477,699 A | | 12/1995 | Guess et al. |
| 5,700,192 A | * | 12/1997 | Rump .................... 454/258 |
| 5,733,191 A | * | 3/1998 | Lam et al. ............... 454/290 |
| 6,007,420 A | | 12/1999 | Harm et al. |
| 6,059,652 A | * | 5/2000 | Terry et al. ............... 454/155 |
| 6,159,092 A | * | 12/2000 | Elder ..................... 454/155 |
| 6,796,895 B2 | | 9/2004 | Demerath |
| 2003/0157880 A1 | * | 8/2003 | Nishida et al. ........... 454/155 |

FOREIGN PATENT DOCUMENTS

| | | |
|---|---|---|
| DE | 30 01 163 A1 | 7/1981 |
| EP | 0 455 566 A1 | 11/1991 |
| EP | 0 717 247 A1 | 6/1996 |

* cited by examiner

*Primary Examiner*—Steven B. McAllister
*Assistant Examiner*—Samantha A Miller
(74) *Attorney, Agent, or Firm*—Brinks Hofer Gilson & Lione

(57) ABSTRACT

A ventilation unit for a motor vehicle passenger compartment has an air feeding channel and an outflow area. The outflow area includes a first and second component that can be placed in different positions relative to each other. Various closing surfaces of the first and second components are variously positionable in relation to each other to produce air flows of differing angle into the passenger compartment.

14 Claims, 8 Drawing Sheets

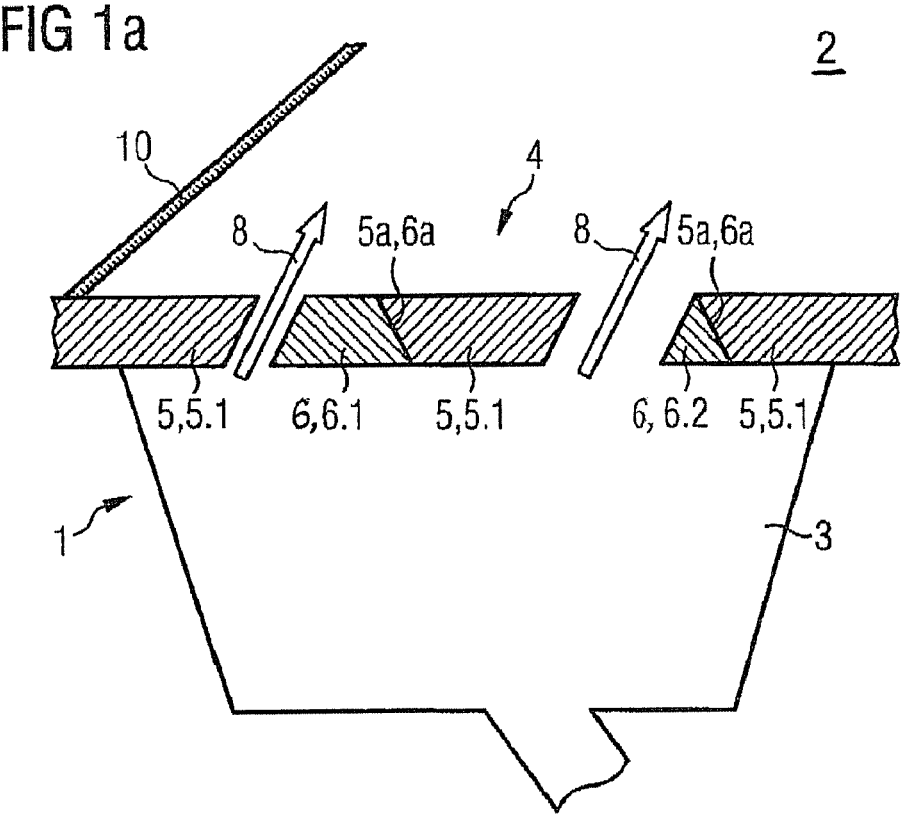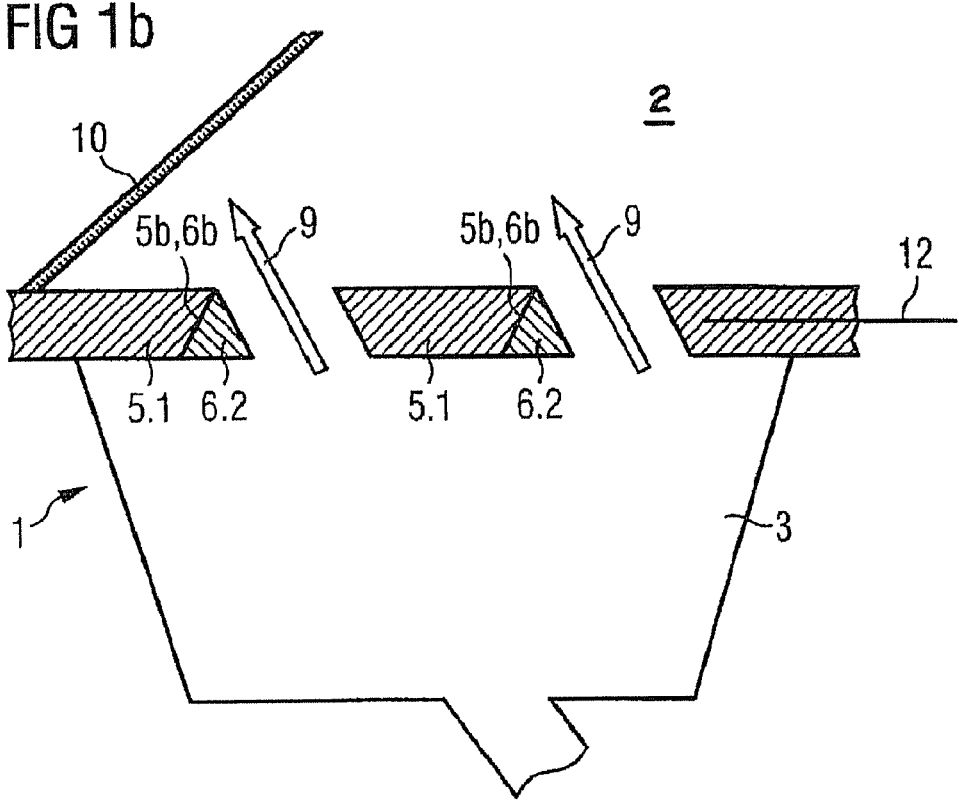

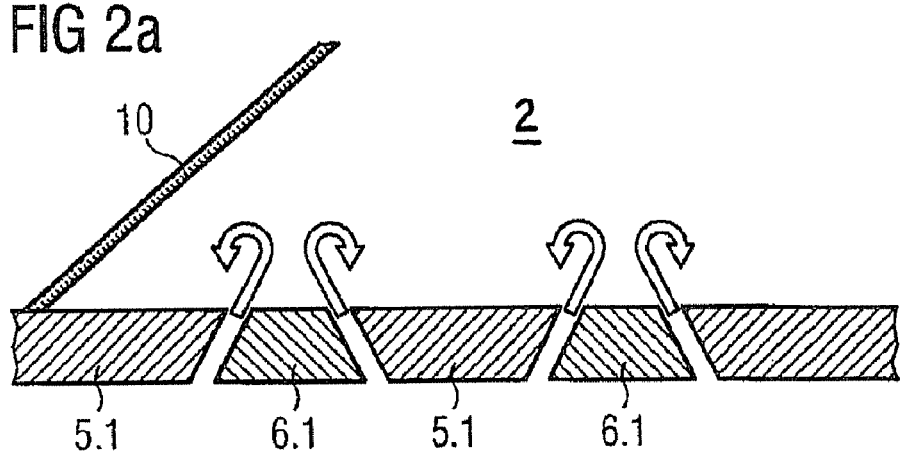
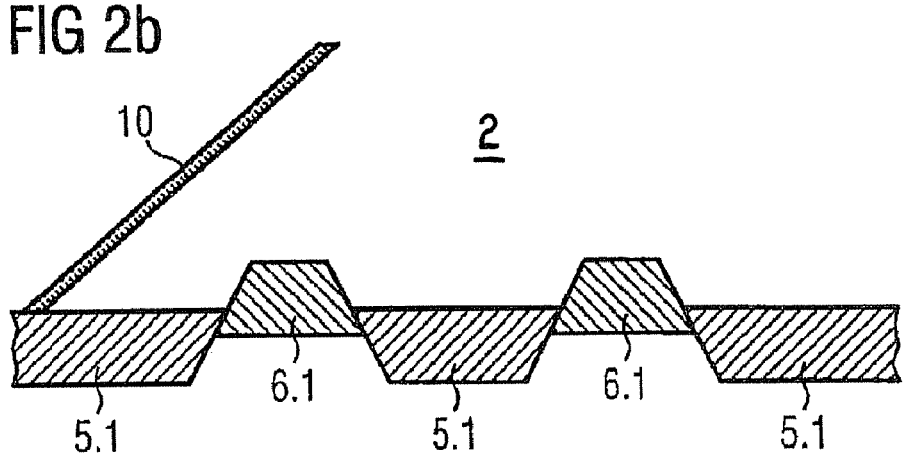
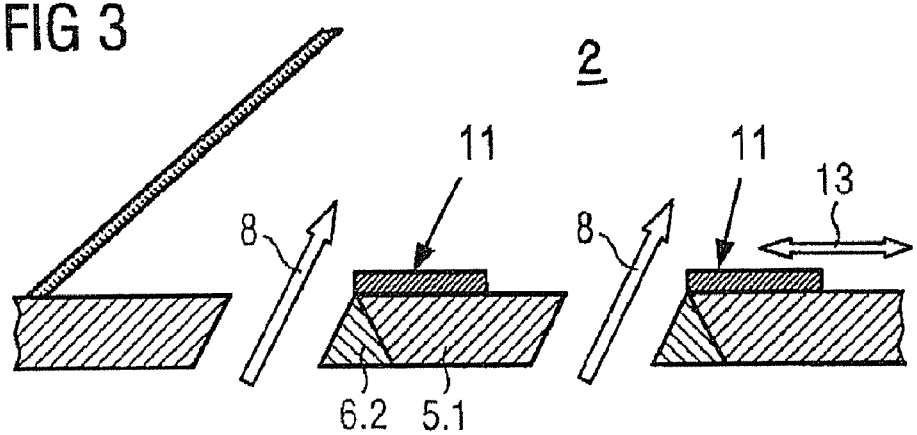

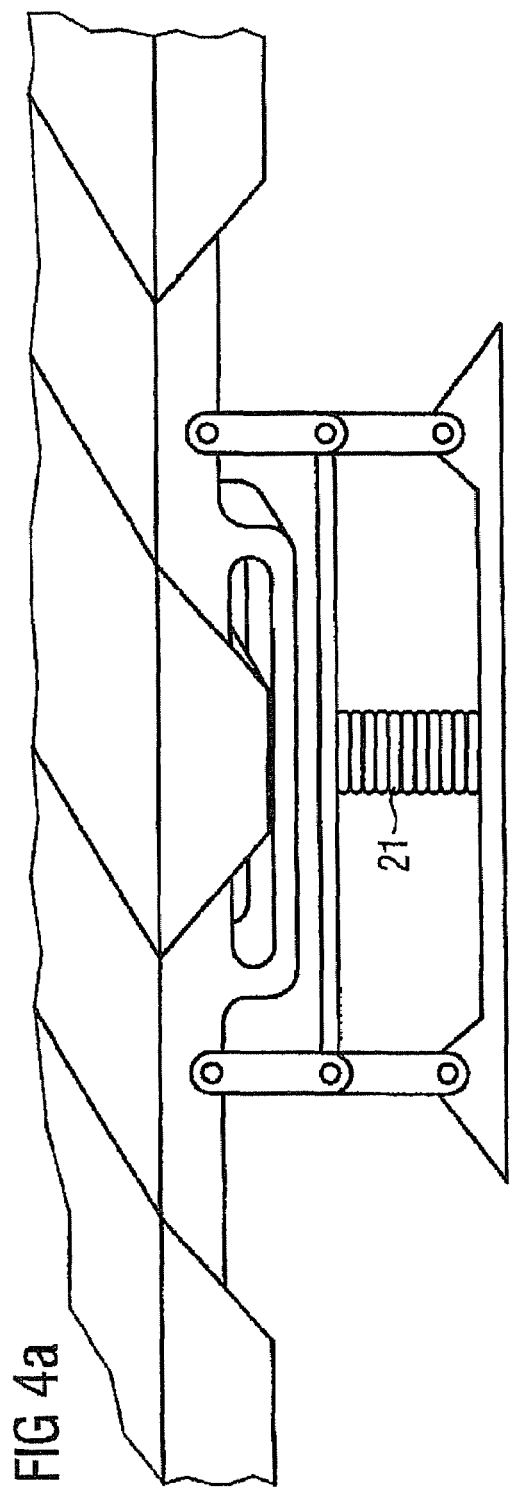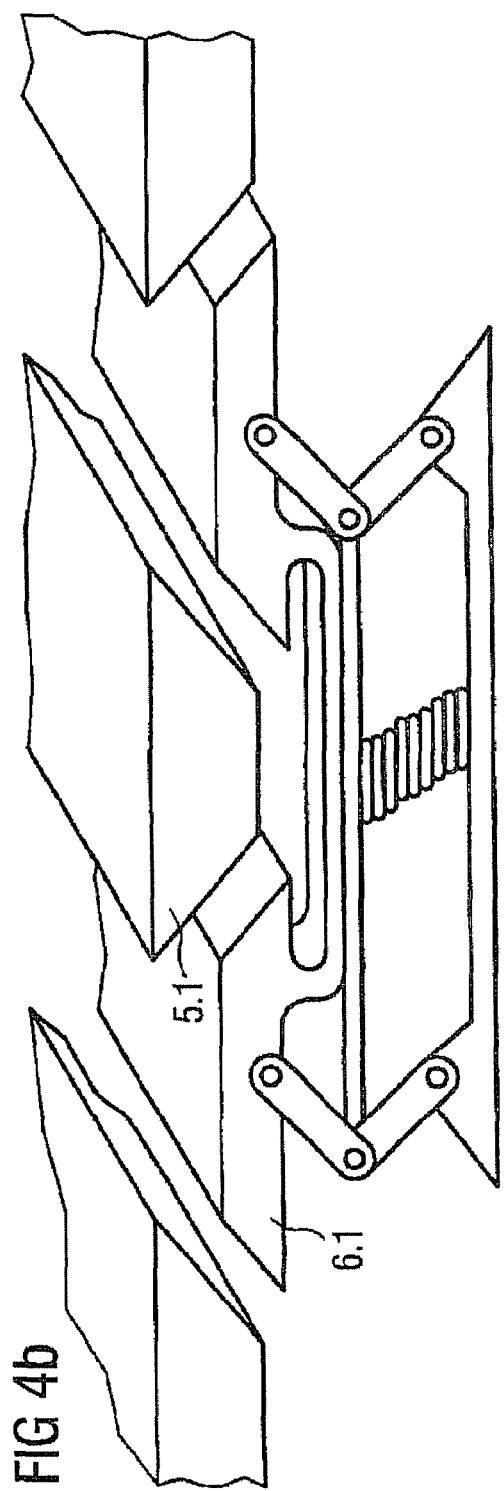

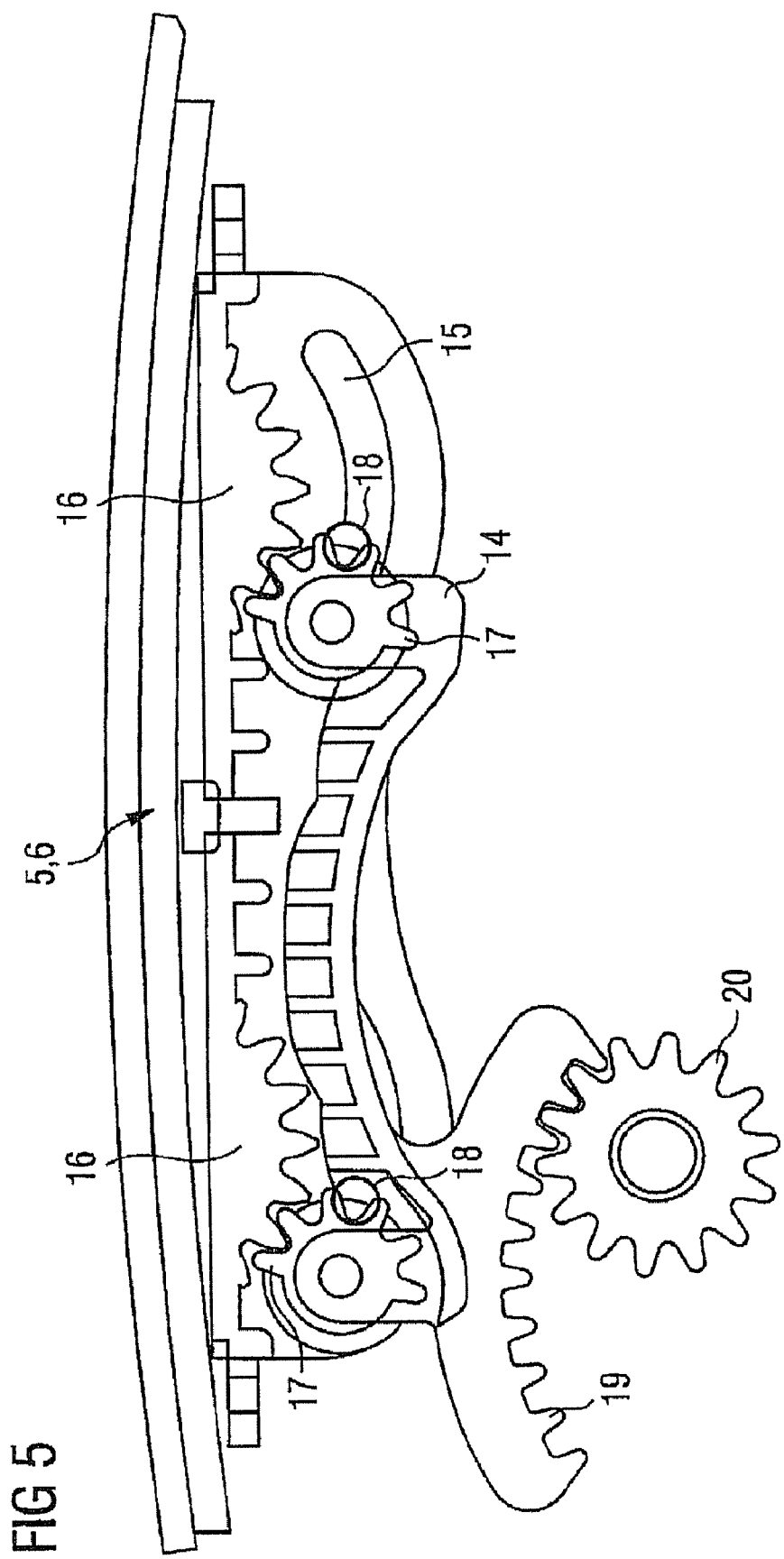

VENTILATION UNIT

BACKGROUND OF THE INVENTION

The present invention relates to a ventilation means/ventilation unit.

It is already known to provide the interiors of motor vehicles with fresh air by way of ventilation channels which are to be opened and closed at the will of the user. Known systems e.g. have pivoting lamellae which are supplied by an air supply channel and e.g. may be closed by way of a rotary flap in the air supply channel. It is also possible to achieve the direction of the air flow by way of pivoting the lamellae.

This known system basically functions in a satisfactory manner. Disadvantages however result on account of the large space requirement, as well as under certain circumstances on account of the complicated design of the closure or pivot mechanisms. A further disadvantage lies in the fact that a direct flow onto the vehicle occupants by way of the directed air flow is often perceived as being uncomfortable.

It is therefore the object of the present invention to provide a ventilation means which may be manufactured in a space-saving manner, which is simple with regard to design, and furthermore provides the possibility of air flow directions which are comfortable for the vehicle occupants.

SUMMARY OF THE INVENTION

The object is achieved by a ventilation unit in particular for motor vehicle interiors with an air supply channel as well as a flow exit region for ventilating the interior. In the flow exit region, a first and a second component are provided which may be brought into various conditions of displacement relative to one another. In the various displacement conditions in each case, different closure areas of the first and of the second component may be applied onto one another for realizing air flows into the interior at different flow angles.

Thus different displacement conditions may be easily set for setting predefined flow exit angles. The first and second components which for this are movable relative to one another may be kept very simple with regard to design and despite this offer a multitude of possibilities for ventilating the vehicle. Thus it is simply possible to provide a ventilation/air conditioning of the interior with a directed air flow (the production of diffuse air flows will be dealt with at a later point). Furthermore it is also possible to achieve a de-icing ("defrosting") of the windscreen with a directed air flow. A further advantage lies in the fact that with this simple design embodiment, the flow exit opening may be created over the whole width of the instrument panel (dashboard) and thus of the vehicle interior. Furthermore, in the region which may be reached by the arms of the vehicle occupants one requires a smaller surface (area) for the supply of fresh air, so that the surfaces which become vacant may be used for other purposes (e.g. navigation systems etc.)

Concluding, the invention thus offers the advantages that it is space-saving and inexpensive, permits a simple assembly and disassembly, that it may be manufactured in a modular construction manner and may render possible improved operational ergonomics as well as an improved "thermal comfort" in the interior of the vehicle.

One advantageous development envisages the first and/or second component having a grid shape. With this its becomes easily possible to realise several flow exit channels arranged parallel to one another on a larger length, which e.g. may be easily accommodated in the corner region between the instrument panel (dashboard) and the windscreen.

At the same time the webs of the grids may have different shapes, advantageous are prismatic shapes which over the length of the ventilation channel (e.g. along the complete upper side of the instrument panel (dashboard)) have a roughly equal cross section. With this, it is particularly simple with regard to design to realise triangular or parallelogram-shaped cross sections of the webs.

A further advantageous development envisages e.g. the first component being stationary and the second component being movable with respect to this. Of course a reverse arrangement is also possible. Basically there are various possibilities of moving the first as well as the second component relative to one another. Relative pivot movements or also translatory displacements in one or two (possible but not necessarily orthogonal) directions are considered here. It is merely important here that the associated closure surfaces of the first and second components come into contact with one another in order thus to impinge the air flows with a stationary flow exit angle.

Basically at the same time the relative movement of the first and of the second component may be realised in the most varied of manners (see examples in the description). Here, manual as well as electro-motoric adjustment possibilities are given One particularly advantageous embodiment envisages two displacement conditions being settable between the first and second component, wherein in the first displacement condition the air flow is directed more greatly towards the centre of the vehicle interior (normal interior climatisation for occupants) and in the second displacement condition an air flow is directed towards the windscreen ("defrost") for de-icing the windscreen.

A particularly advantageous development envisages the possibility of yet a further displacement condition with which none of the closure surfaces lie on one another. In this case no defined flow exit angle is set since the components in an "intermediate position" or "middle position" lie between the two different displacement conditions in each case with rigidly defined flow exit angles. The advantage of this position is that a "diffuse" air flow may be easily produced which entails no direct flow onto the occupants and thus is subjectively perceived as being comfortable by the occupants.

Another development envisages a further displacement condition being able to be set, with which the closure surfaces (i.e. side surfaces of complementary triangles or parallelograms in the cross sectional shapes of the webs of the first as well as second component) all lie on one another. A closure of the flow exit region becomes possible by way of this in order therefore in a simple manner to permit the complete closure of the ventilation means as well as the setting of different flow exit angles as well as a diffuse flow exit with only two components which are mutually displaceable. The closure, with which all closure surfaces lie on one another, is effected preferably by way of a displacement of the second component in a height direction perpendicular to the flow exit plane. By way of lateral displacement of the first and second component in the flow exit plane in each case different closure surfaces are brought into contact with one another so that with this one may determine a ventilation direction. By way of a height displacement a regulation of the completely open condition to closure takes place.

As an alternative to this, a further development envisages a third component (e.g. grid-like) being provided which is movable for the closure of the flow exit region, independently of the movement condition of the first and/or the second component. Here it is the case more or less of a displaceable cover flap which is arranged above or below the first and the second component and thus permits the closure of the ventilation means.

Various materials are possible for the selection of materials for the ventilation means. Here, it lends itself to provide the first and second component as a fixed integral component of the instrument panel (dashboard) so that already during the manufacturing process one may create a suitable grid or web structure. This e.g. is possible from usual plastics (polypropylene etc). Of course it is also possible given particularly great demands on the temperature and stability resistance to provide metal die-cast parts, e.g. aluminum die-cast parts.

A further advantageous development envisages the first and/or the second component being designed as an essentially plane grid, and at least two displacement conditions with which in each case different closure surfaces of the first and second component lie on one another, are arranged in one plane. The displacement conditions which ventilate at different flow directions (for example windscreen or vehicle interior) thus lie at the same height level. The components thus are more or less arranged in a "meshing" or "alternating" manner, and not over one another. By way of a height displacement of the first or second component which is to be additionally provided, the air flow is yet further set with regard to its intensity (up to a complete closure).

A further advantageous further development envisages the first and the second component being designed in an essentially prismatic manner and/or longitudinally grid-like manner, and webs of the first and second component being arranged in an alternating manner to one another. Of course it is also possible to provide only a single web which for example belongs to the second component and which is movable between two webs of the first component. Advantageously however there are several webs since from this one may obtain a particularly large-area flow. In any case however, for example the second component with respect to the first component is to be laterally (i.e. in a plane) movable for creating different flow directions, and is to be arranged displaceable in height for the closure of the flow.

Further advantageous embodiments envisage mechanisms for the relative movement of the first and of the second component to one another. These envisage the second component being fastened to a carrier, wherein the carrier is guided such that the second component with respect to the first component is displaceable laterally or in height. Several embodiments are possible with regard to this.

In a first embodiment the carrier is guided via e.g. a spring-supported double joint. By way of collapsing the double joint (preferably two which are connected to one another via a web), infinite closure conditions (flow of windscreen, flow of interior as well as a closure lying between this, see in particular FIGS. 4a and 4b) may be achieved.

A second embodiment envisages the carrier being movably connected to elements connected to the first component via movable friction pairings, preferably cogs (see FIGS. 5-9). For this, a first friction pairing ensures a connection of the carrier to a drive, for example a stepper motor. A second friction pairing ensures the connection of the carrier to the first component or to the elements connected to the first component. At the same time it may be advantageous further to the guiding of the friction pairings to provide an additional guide rail of the carrier relating to the first component.

This embodiment has the great advantage that practically any movement guiding of the second component with respect to the first component is possible. At the same time it is particularly advantageous for this for the carrier to be guided such that it executes an epicycloid movement, wherein in one displacement condition only first closure surfaces of the first and second component lie on one another, in a second displacement condition only second closure surfaces of the first and the second component lie on one another and in a movement condition lying therebetween first and second closure surfaces simultaneously lie on one another. For this e.g. in a first movement condition one may create a flow onto the windscreen, in the second movement condition into the interior, and a closure may take place in the movement condition lying between these. The epicycloid movement of the carrier at the same time on the one hand ensures a lateral displacement and a height adjustment and on the other hand an approach of the closure surfaces to one another with a relative friction which is as small as possible so that the closure surfaces are not worn by way of friction and thus become unsightly or become less airtight.

Further advantageous developments of the present invention are specified in the remaining claims.

BRIEF DESCRIPTION OF THE DRAWINGS

FIGS. 1a and 1b two displacement conditions of a ventilation means according to the invention, FIG. 2a a ventilation means according to the invention in an "intermediate position" for producing diffuse air flow, FIG. 2b the ventilation means according to the invention in the closed condition, FIG. 3 a further variant of a ventilation means according to the invention, FIGS. 4a and 4b movement conditions of a first embodiment form of a movement mechanism for the webs lying on one another, FIGS. 5-9 details of a second embodiment form of a movement mechanism for webs lying on one another.

DESCRIPTION OF PREFERRED EMBODIMENTS

Figure 6A:
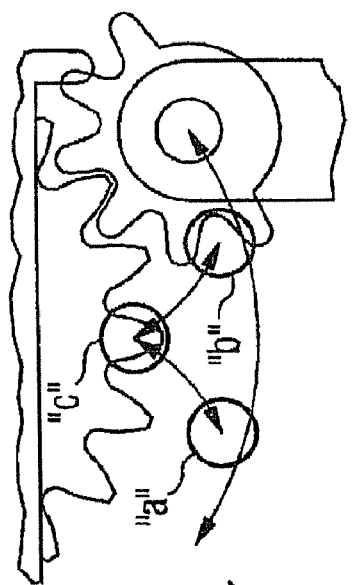

FIG. 1a shows a ventilation means 1 according to the invention. This is accommodated within a motor vehicle interior 2 which is limited to the front by a windscreen 10. The ventilation means comprises an air supply channel 3 which is connected to an air conditioning installation or likewise, which is not shown here. The air supply channel 3 may be connected to the interior of the motor vehicle via a flow exit region 4. A first component 5 which is rigidly connected to the instrument panel (dashboard) is shown in cross section in the flow exit region 4. This component comprises webs 5.1 which run in the vertical axis to the plane of the sheet and which have an essentially parallelogram-like cross section over the complete length of the web. The parallelograms at the same time are directed downwards with their smaller cover surface so that lateral inclinations arise which on the left side run from the top left to the bottom right, and on the right side from the top right to the bottom left. Here it is the case of "closure surfaces" according to the invention, for contacting with a second component 6.

This second component 6 is likewise designed in a grid-like manner, i.e. it consists of several parallel webs lying next to one another. These webs may have different cross sectional shapes. A web shape with a parallelogram-like cross section 6.1 is possible, alternatively webs 6.2 which are triangular in cross section are also possible. It is essential that the webs 6.1 and 6.2 are formed complimentarily to the webs 5.1 of the first component 5. The parallelogram-like webs 6.1 for this have the smaller cover surface on the upper side and the larger cover surface on the lower side so that the lateral surfaces (which serve as "closure surfaces") run on the left side from the top right to the bottom left and on the right side of the parallelogram cross section from the top left to the bottom right. A corresponding course is also the case with the web 6.2.

In the embodiment shown in FIG. 1*a* in each case the right side surface of the webs 6.1 and 6.2 border the webs 5.1. Thus the respective complementary side surfaces 5*a* and 6*a* contact one another. This leads to the fact that in each case a passage of air is not possible in this region. However a gap for the exit of air flows 8 into the interior 2 is formed along the left side surface of the webs 6.1 and 6.2. These air flows have a predefined angle which arises due to the fact that the exiting air is guided along the left side surfaces of the webs 6.1 and 6.2 as well as the right side surfaces of the webs 5.1 of the first component 5. Thus a flow 8 results which is directed essentially into the vehicle interior, towards the vehicle occupants.

FIG. 1*b* shows a further displacement condition of the first component 5 to the second component 6 (for simplification, here a uniform triangular cross section of the webs 6.2 is shown).

In the middle plane 12, the webs 6.2 have a lesser width than the distance between the individual webs 5.1. By way of this the condition results in which given a translatory displacement of the webs 6.2 in the plane 12, the gap between the webs 5.1 is in each case greater than the widths of the webs 6.2 in the plane 12. Thus due to this, a gap always remains as long as the webs 5.1 and 6.2 are located at the height arrangement to one another shown in FIG. 1*b* and 1*a* respectively (i.e. that both have their middle level in the plane 12). This was formed by the side surfaces in FIG. 1*a* such that air flows 8 arose. In FIG. 1*b* then, the closures surfaces are the surfaces 5*b* (i.e. the right side surfaces of the webs 5.1) and 6*b* (i.e. the left side surfaces of the webs 6.2) These therefore are the surfaces which in FIG. 1*a* served for leading in air flow 8.

In FIG. 1*b* the conditions are thus reversed. The closure surfaces shown in FIG. 1*a* now serve for conducting an air flow 9, whilst the side surfaces serving to conduct the air flow 8 in FIG. 1*a* only serve as closure surfaces. Thus here, (analogously to FIG. 1*a*) there results an air flow 9 which is directed in the direction of the windscreen 10 and thus may serve for "de-icing"/"defrosting" the windscreen 10.

Basically there are many possibilities of displacing the webs 6.2 (or 6.1) with respect to the webs 5.1, i.e. of moving the first component relative to the second component. It is possible e.g. to rigidly connect the first component to the interior trim/panelling of the vehicle and to arranged the second component 6 in a manner which is pivotable to this or in a manner which is displaceable in the plane 12. It is further possible to displace or to pivot the two components also in their height level with respect to the plane 12 in order in this manner to reduced the gap space for passing air flows.

FIG. 2*a* shows a further position of the ventilation means according to the invention. Here, the webs 6.1 (this time designed in the manner of a parallelogram) are arranged in the middle position between the webs 5.1. A gap space for leading through air results by way of this on the side surfaces of the webs 6.1 on both sides. The gap space is significantly more restricted than according to FIGS. 1*a* and 1*b* and air flows which in each case flow on both sides around a web 6.1 impinge one another above the web 6.1 so that here a swirling occurs and a "diffuse" air flow occurs which is neither directed directly onto the windscreen nor is directed directly into the vehicle interior. Here, on account of this there results the advantage that no subjective "direct flow" may be perceived by the vehicle occupants and despite this the desired air circulation in the interior of the vehicle is rendered possible.

In FIGS. 1*a* and 2*a* up to now it was the displacements of parts of the second component (6.1 and 6.2) which were shown. With all embodiments however additional movement possibilities are given, such as by way of a relative height displacement (perpendicular to the plane 12) of the second component with respect to the first component.

FIG. 2*b* shows a further displacement condition of the ventilation means shown in FIG. 2*a*. With this, the webs 6.1 (thus the second component 6) are displaced in height with respect to the first component or the first webs 5.1, thus achieve a larger height level with respect to the plane 12. The gap space between the complementary webs are closed by way of this, so that air may no longer get through the flow exit region 4 from the air supply channel into the vehicle interior.

Finally FIG. 3 in a further embodiment shows a ventilation means according to the invention. Here in each case there are provided triangular webs 6.2 with a relative small cross sectional surface. A third component 11 which lies on the webs 5.1 of the second component 5 may be closed in a translatory manner in the direction 13 in order thus to completely close the gap between the webs 5.1 and thus (analogously to the effect with regard to FIG. 2*b*) to prevent the passage of air through the flow exit region 4.

The drawings which have been shown until now are to represent the principle of these figures. All of the objects shown here may consist of any materials, e.g. plastics such as polypropylene or metals such as die-cast aluminium.

FIGS. 4*a* and 4*b* show a design formation of one ventilation means which has already been schematically shown in FIGS. 2*a* and 2*b*. Here it is essential that the webs 6.1 are adjustable in height to the webs 5.1 by way of a spring-lever mechanism (spring 21) and thus an opening or a closure of the flow exit region is possible. At the same time the webs 6.1 of the second component are connected via a carrier in the form of double joints, wherein the double joints in turn are connected to one another via a web.

With regard to this, the middle position shown in FIG. 4*a* shows the closed condition in which a spring retains the stable middle position.

The opened condition is shown in FIG. 4*b* with which a flow in the direction of the windscreen is shown. Alternatively by way of tilting the webs 6.1 in the plane 12 in the opposite direction a directed flow of the interior is possible.

One preferred embodiment of the invention is now explained in the FIGS. 5 to 9. Here a movement of the second component with its webs according to FIGS. 1*a*-2*b* is shown.

FIG. 5 schematically shows the movement mechanism which is to be explained. Here, the ventilation exits, formed of a first and second component 5, 6 on the upper side are shown according to FIGS. 1*a*-2*b*. Here there are provided a stationary first component 5 as well as a second component 6 which is movable to this. Fastened to the first fixed component 5 on the side which is distant to the vehicle interior, a toothed rim whose teeth point downwards is provided twice. Furthermore, two guides 15 for a carrier 14 are provided on this component.

The carrier 14 furthermore shows cogs 17 which mesh with the toothed rims 16. The bearing arbors of these cogs 17 run in the rail-like guides 15. Suspension pins 18 are eccentrically attached to the cogs 17 and are connected to the second component (thus the webs 6.1 and 6.2). With regard to this it is to be specified that the webs 6.1 and 6.2 are connected to one another by way of suitable transverse supports so that it in theory it is sufficient to only provide a single suspension pin 18.

Proceeding from the suspension pin 18 there is further illustrated a kinematics curve (movement contour) of the mechanism shown here for the drive of the second component. Here it is the case of a "hill-like" curve with curved "hill flanks". In the position shown in FIG. 5 the left surfaces of the webs 6.1 lie on the right surfaces of the webs 5.1 (analogously to FIG. 1*b*). At the tip of the hill a closure of the ventilation system takes place (analogously to FIG. 2*b*). A movement condition corresponding to FIG. 1*a* is shown at the right lower end of the right hill flank.

The carrier 14 on its lower side comprises a further toothed rim 19 which is meshingly connected to a drive cog 20 of a drive. The drive cog 20 is driven by an actuating drive, e.g. a stepper motor which controls the movement conditions and thus the ventilation conditions, in accordance with instructions of the climatisation automisation system or the vehicle passenger.

FIG. 6 once again shows a movement condition according to FIG. 1*b* in detail. Here the webs 5.1 with their left side surfaces are arranged on the right side surfaces of the first webs 5.1 The second webs 6.1 are rigidly connected to one another via a transverse rib which is not shown here. By way of this a flow exit direction 9 in the direction of the windscreen 10 is made possible.

As already described above, a suspension pin 18 is connected to the webs 6.1 of the second component. The movement of this pin is shown schematically in FIG. 6*a* by way of three circles (indicated at "a", "b", and "c"). In the position shown in FIG. 6 the movement pin is in position "a" which would thus correspond to FIG. 1*b*. The position "c" corresponds essentially to FIG. 2*b* and the position "b" essentially to the position in FIG. 1*a*. With regard to this, the supplementary explanations with regard to FIG. 5 are also pointed out.

For further emphasis, again an enlarged representation of the epicycloid movement curve between the movement conditions "a", "b" and "c" is shown in FIG. 6*a*.

Figure 6:
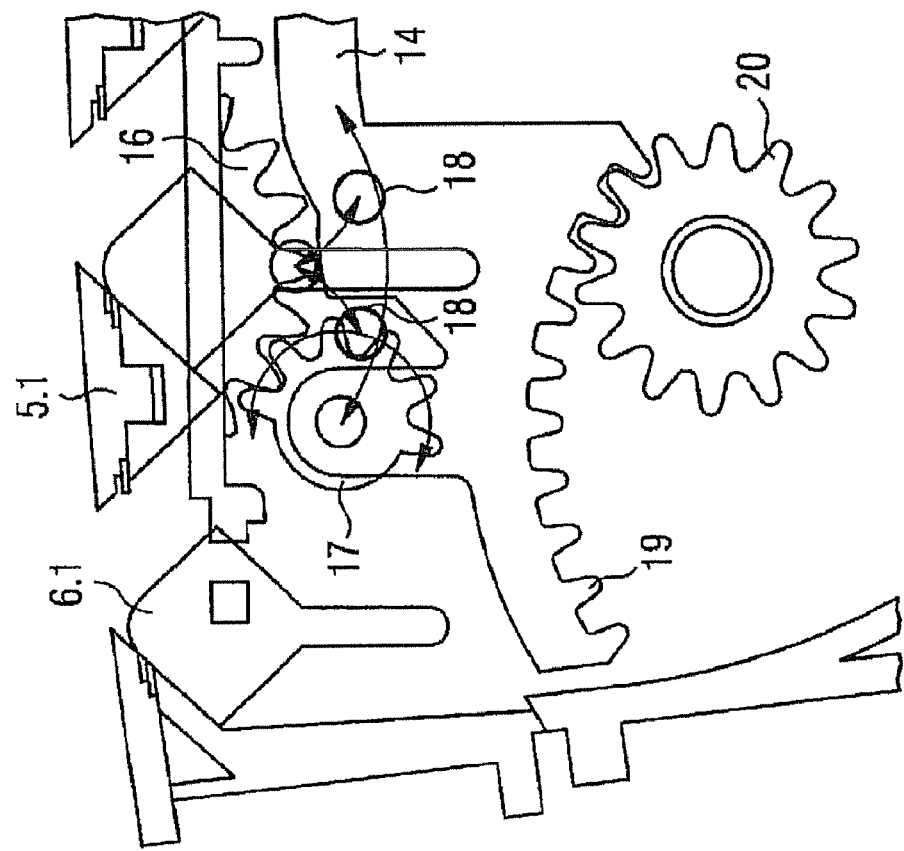
Figure 7:
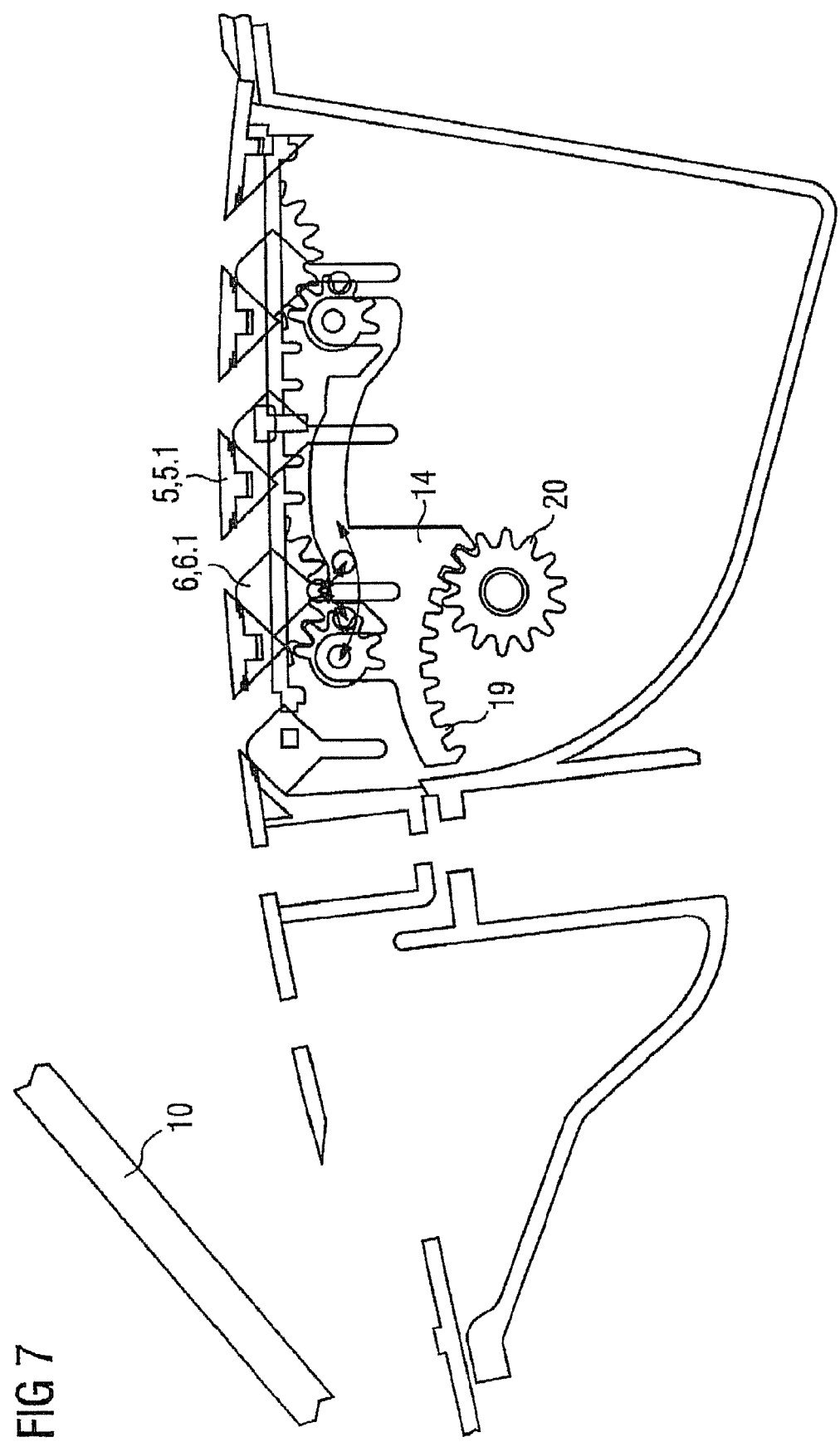

FIG. 7 once again shows the condition of FIG. 6, however in a different scale so that the total picture including the windscreen 10 can be seen here.

Figure 8:
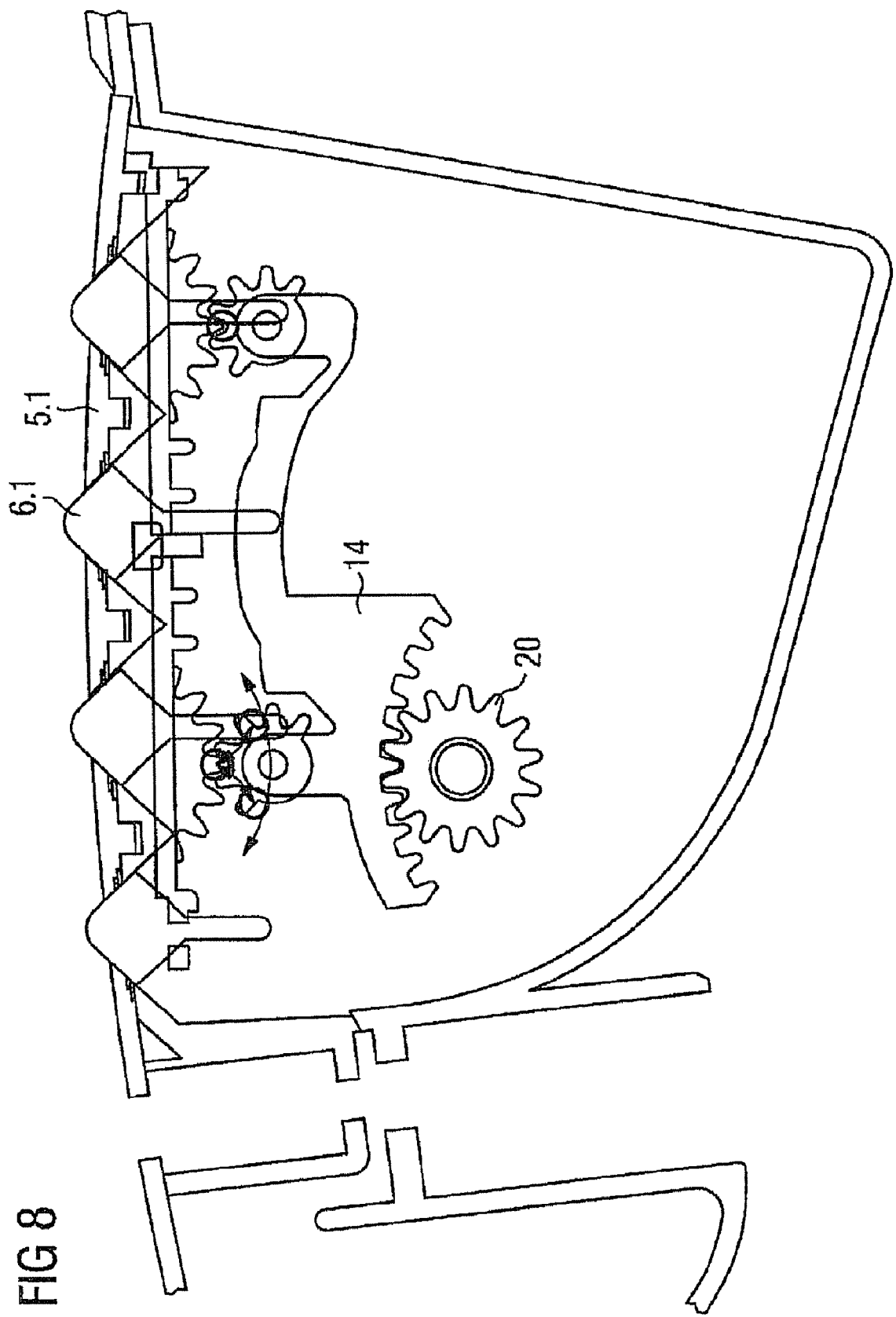

FIG. 8 shows the condition corresponding to FIG. 2*b* or the movement condition in "b" in which the first and the second component close one another.

Figure 9:
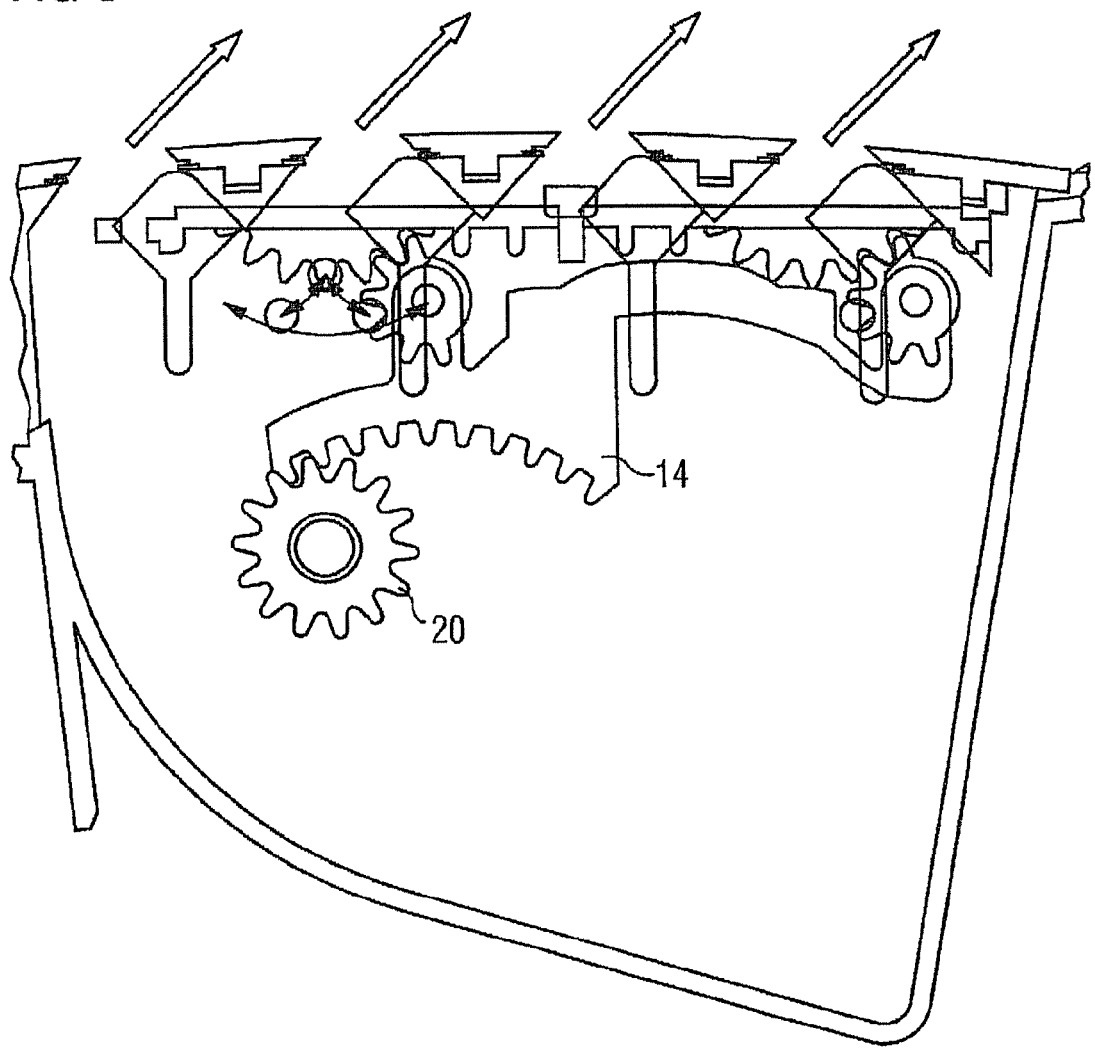

Finally, the movement condition corresponding to FIG. 1*a* is shown in FIG. 9.

Thus a ventilation means is shown here with which the first and the second component are designed in a longitudinal grid-like manner and webs of the first and second component are arranged in an alternating manner to one another. At the same time the second component 6 with respect to the first component 5 is arranged laterally displaceable (in plane 10) for producing different flow directions 8, 9, and for the closure of the flow, (perpendicular to this) is arranged displaceable in height.

That which is essential for the movement mechanism shown here is that the second component 6 is fastened on a carrier 14, wherein the carrier is guided such that the second component is displaceable laterally and/or in height with respect to the first component. With regard to this, in the embodiment according to FIGS. 5-9, the carrier 14 is moved by way of movable friction pairings, preferably cogs (of course e.g. rubber surfaces rolling along and on one another, etc. are also possible). For this, first and second friction pairings are provided, and at least one guide rail is provided for guiding the carrier. At the same time the carrier is preferably guided such that an epicycloid movement is given, wherein only first closure surfaces of the first and of the second component lie on one another (according to condition in FIG. 1*b*) in a first movement condition "a". In a second displacement condition only second closure surfaces of the first and of the second component lie on one another ("b", see also FIG. 1*a*), and in a movement condition lying therebetween ("c") only first and second movement surfaces so that a complete closure is given.

The advantages of the drive shown here with the arcuate movement curves lies in the fact that this rolling movement produces very little friction and may be produced in an exact manner also with very small stepper motors. Furthermore a lifting of the webs/prisms is achieved in a particularly gentle manner by which means scratches on sensitive surfaces are avoided.

The invention claimed is:

1. A ventilation unit for ventilating the interior of a motor vehicle, the ventilation unit having an inner supply channel and a flow exit control apparatus, the flow exit control apparatus comprising:

a first component having an upper surface defining a flow exit plane, and a second component, which can be brought into different displacement conditions relative to the first component, each of the first and second components having closure surfaces, the second component being laterally displaceable with respect to the first component parallel to the flow exit plane to direct air at various exit angles, the second component being vertically displaceable with respect to the first component and the flow exit plane so that separated confronting closure surfaces on the first and second components can all lie on one another to permit complete closure of the flow exit control apparatus to inhibit the exit of air from the ventilation unit by eliminating any air flow between the first and second component, wherein the flow exit control apparatus of the unit is connected to a motor vehicle windscreen, and lateral displacement of the second component to a first position directs an air flow toward the windscreen and lateral displacement of the second component to a second position directs an air flow toward a central interior of the motor vehicle.

2. The ventilation unit of claim 1 wherein at least one of the first and second components comprises a grid.

3. The ventilation unit of claim 2 wherein the second component can be displaced to at least two different positions wherein the closure surfaces of the second component are aligned as a planar grid with different closure surfaces of the first component.

4. The ventilation unit of claim 1 wherein at least one of the first and second components comprises a prismatically shaped web.

5. The ventilation unit of claim 1 wherein the second component is additionally displaceable to a position wherein none of the closure surface contact one another.

6. The ventilation unit of claim 1 wherein the second component is additionally displaceable to a position wherein all of the closure surface contact one another.

7. The ventilation unit of claim 1 wherein the closure surfaces of the first and second components are interspaced so that each second component closure surface is separated from any adjacent second component closure surface by at least one first component closure surface.

8. The ventilation unit of claim 1 further comprising a carrier to which the second component is fastened, the carrier being guided to permit lateral or vertical displacement of the second component with respect to the first component.

9. The ventilation unit of claim 1 wherein the closure surfaces of the first and second components are constantly situated at a fixed angular relationship with respect to each other and the flow exit plane.

10. The ventilation unit of claim 8 further comprising a spring-supported double joint for guiding the carrier.

11. The ventilation unit of claim 8 further comprising a frictional pairing connecting the first component to the carrier so that the carrier is movable with respect to the first component, and a drive mechanism for adjustment of the friction pairing.

12. The ventilation unit of claim 11 wherein the frictional pairing comprises a pair of interconnected cogs.

13. The ventilation unit of claim 11 further comprising a guide rail connecting the carrier to the first component.

14. The ventilation unit of claim 13 wherein the guide rail is configured to cause the carrier to execute an epicycloid movement so that in a first displacement condition only a first set of closure surfaces of the first and second components lie on one another, in a second displacement condition only a second set of closure surfaces of the first and second components lie on one another, and in a third displacement condition, lying between the first and second displacement conditions, closure surfaces from the first and second sets lie on one another.

* * * * *